Figure 1:
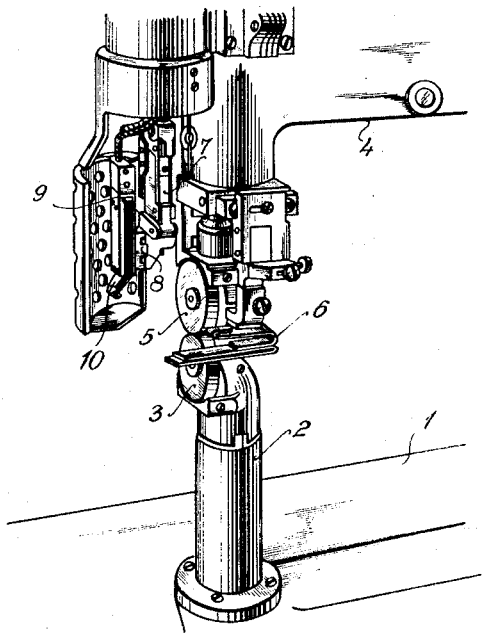

Oct. 27, 1959   E. SCHENKENGEL   2,910,568
RESISTANCE HEATING DEVICE
Filed Jan. 9, 1957

INVENTOR
Emerich SCHENKENGEL
BY
ATTORNEY

United States Patent Office 2,910,568
Patented Oct. 27, 1959

2,910,568

RESISTANCE HEATING DEVICE

Emerich Schenkengel, Kaiserslautern, Pfalz, Germany, assignor to G. M. Pfaff, A.G., Kaiserslautern-Pfalz, Germany, a corporation of Germany Application January 9, 1957, Serial No. 633,233

3 Claims. (Cl. 219—19)

The present invention relates to electric resistance heating devices, more particularly to heating devices for applying heat to a relatively narrow linear or strip-like area of a member to be heated, such as a pair of superposed thermoplastic plates, sheets, foils or the like members, preparatory to pressure welding of the members at said area.

Known machines for sealing or welding a pair of superposed thermoplastic members, such as sheets or foils, comprise means to first heat or soften the material at the linear or strip-like welding area and to subsequently unite the members by pressure applied to the heated areas, to effect joining of the materials across the interface and to thereby create a permanent seal or bond thereat between the members.

In order to heat or soften the members at a narrow linear or strip-like area, preparatory to welding by pressure, it has furthermore been proposed to use a V- or wedge-shaped heating element with its apex line arranged or passed in close contact with the superposed members to be heated. The element consisting of high heat conducting material, such as copper, silver, etc., is heated to softening or welding temperature of the materials to be welded by means of a separate electric heater in the form of a resistance wire or coil wound around or mounted upon the base of the unit and mounted together with the unit upon a suitable support or holder member.

Heating devices of this type, wherein the heat is transmitted by conduction from a separate heating coil or resistance to the V-shaped heater, aside from other defects and draw-backs, suffer from a substantial loss of heat due to radiation. Furthermore, aside from the low efficiency of such a heater, devices of this type have the further disadvantage that the radiated heat may deleteriously affect the adjacent parts of the machine, not to mention the relatively short life of the unit and the large mounting space required.

Another drawback of heaters of this type utilizing a separate electric heating winding is due to the fact that considerable time is required from the instant of connecting the heating winding until the temperature at the apex of the V has attained a desired value determined by the softening or welding temperature of the particular materials to be welded. This results in a further reduction of the efficiency and limited usefulness of the welding machine, especially where the heater has to be connected and disconnected frequently during use and operation of the machines. For this reason, it is difficult with known heaters of the type described to efficiently and reliably control the heating temperature, to suit different materials of varying softening or welding point or to comply with other existing conditions or requirements.

Accordingly, an object of the present invention is the provision of a heater of the type described, wherein the heat is generated directly within the V- or wedge-shaped heating element, to substantially reduce or eliminate losses by radiation as well as other defects and drawbacks inherent in the prior heater structures.

Another object of the invention is the provision of a welding heater of the above type which can substantially instantly be brought to welding or operating temperature.

Yet another object of the invention is the provision of a welding heater of the above type, the temperature of which can be controlled instantly and effectively, to suit existing welding conditions and requirements.

Another object of the invention is the provision of a linear V-shaped resistance element constructed to provide a favorable temperature distribution at the apex of the V.

Figure 2:
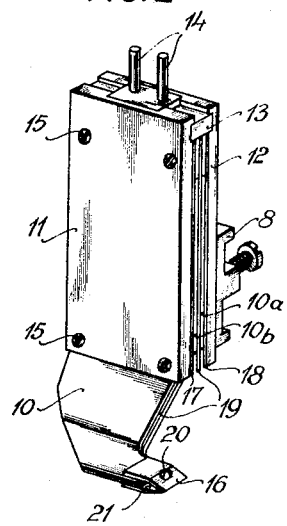

The invention, as to its further objects and novel aspects, will be better understood from the following detailed description taken in reference to the accompanying drawing, forming part of this specification and wherein:

Fig. 1 is a perspective view of a machine for welding thermoplastic and the like members and embodying a heating device constructed in accordance with the principles of the invention; and Fig. 2 is an enlarged perspective view of the heating device of Fig. 1.

With the foregoing objects in view, the invention involves generally the provision of a V- or wedge-shaped heating element directly traversed by an electric heating current and constructed for this purpose in the form of a flat strip of sheet metal of relatively high resistivity and bent into a V, and a pair of conducting members integral with or connected to said V of relatively low resistivity and serving as supports and means to apply electric heating current to said element. The entire heater assembly may be mounted upon a suitable support provided with current terminal posts for passing heating or operating current through the unit, to raise it to a desired temperature.

In a preferred embodiment, the conducting members and V-shaped heater consist of separate parts or elements, the former in the form of a pair of metal strips of relatively high conducting material, such as copper, etc., and the latter in the form of a small metal sheet element of a material of high resistivity, such as a high resistance alloy as used in electric resistance heating devices, said element being bent into a V and connected to said conducting members by any suitable means, such as by clamping, riveting, welding, etc. In order to achieve a favorable temperature distribution, the V-shaped heater element may be provided with recesses or perforations and, furthermore, the space enclosed by the V may be filled with an insulating material, such as a suitable ceramic or the like, to increase the mechanical strength of the unit.

Referring to the drawing, the welding machine shown for uniting or sealing thermoplastic sheet material or the like, resembles the general construction of a sewing machine, being mounted upon a base 1, such as a table top or other support. The machine, of which only those parts are shown in the drawing necessary for the understanding of the invention, comprises a column 2 upon which is rotatably mounted the lower pressure and feed roller 3, a cooperating feed roller 5 being mounted upon the head of the overhanding upper arm 4 of the machine. Item 6 is a feeding guide for the sheets or the like members to be welded being also mounted upon or supported by the head of the arm 4. The support or carrier for the heating unit 10 is rotatably mounted upon said head, in such a manner that it may be swung together with the heater 10 from a non-operative position shown in the drawing to an operative position of the heater intermediate the guide 6 and feed rollers 3 and 5. As is understood, in the latter position, the apex of the V-shaped heater 10 adjoins the superposed members to be welded being fed by the rollers 3 and 5. The material of the members may thus be softened or melted and joined by pressure welding at a continuous welding line, in a manner readily understood and known from similar pressure welding machines of the general type described.

Fig. 2 shows in greater detail a preferred construction of the heating unit 9 of Fig. 1. The support or carrier of the unit comprises a pair of end or cover plates 11 and 12, which may be of metal and separated by one or more insulating spacing members 13. Items 14 are a pair of terminal posts mounted upon said support for applying operating or heating current to the device. The parts may be secured or held in assembled position by any suitable means, such as by screws or bolts 15.

The heater unit proper is shown to consist of a pair of parallel metal strips 10a and 10b of relatively low resistivity and being insulatingly mounted between the end plates 11 and 12. The strips 10a and 10b protrude in the downward direction from the plates or supports 11 and 12 and are shown to taper into smaller and narrower suitably bent end portions to which is secured both mechanically and electrically the heater element 16 in the form of a metal sheet member of relatively high resistivity bent into a V or wedge shape. Thus, if the member 16, by way of example, consists of a high resistance alloy and the strips 10a and 10b are of copper or the like high conducting material, a current passing through the heater will cause a heating of the element 16 to the desired temperature, without substantially raising the temperature of the members 10a and 10b which merely serve as current leads and supports for the element 16. The latter may be secured to the strips or members 10a and 10b by any suitable means, such as by welding, riveting, etc.

The strips 10a and 10b are insulated, in the example shown, from the end plates 11 and 12 by spacing sheets 17 and 18 of a suitable insulating material, and similarly, the strips are insulated from one another by an insulating spacer 19. As is understood, the strips 10a and 10b are electrically connected to the terminal posts 14.

In the example shown, the sides of the V-shaped heater member 16 are provided with recesses 20, to create a favorable temperature distribution upon the surface of the heater at the apex of the V. Furthermore, the space enclosed by the V may be filled with a suitable insulating material, preferably a ceramic or the like, to increase the mechanical strength of the unit.

While the invention has been described in the foregoing with specific reference to the welding or sealing of thermoplastic members, it is understood that the improved heating unit may be employed in connection with the pressure welding of other materials, such as ductile metal sheets or foil with or without a thermoplastic coating, or, generally, in all such cases or applications, where heat is to be applied to a linear or strip-like area of a member to be heated to a desired temperature thereat.

In the foregoing, the invention has been described with reference to a specific illustrative device. It will be evident, however, that variations and modifications, as well as the substitution of equivalent elements for those shown for illustration may be made without departing from the broader scope and spirit of the invention, as set forth in the appended claim. The specification and drawing are accordingly to be regarded in an illustrative rather than a restrictive sense.

I claim:

1. An electric heater of the type described comprising a support, a pair of parallel relatively closely and insulatingly spaced strip-like conducting members of relatively low resistivity and mounted upon said support, said members having main portions tapering into narrow end portions, a sheet metal resistance heating element of relatively high resistivity bent into a V and connected to said end portions to provide a series current path through said members and said element, the sides of said element being provided with recesses to vary the heat distribution at the apex of the V, and electric terminal means mounted upon said support and connected to the remaining ends of said members.

2. An electric heater of the type described comprising a support, a strip-like resistance heating element mounted upon said support, said element having a pair of parallel conducting portions of relatively low resistivity and relatively large width and having one pair of adjacent ends thereof tapering and terminating in a V-shaped heating portion of relatively narrow width and relatively high resistivity, the sides of said heating portion being provided with recesses to vary the heat distribution at the apex of the V, and electric terminal means connected to the remaining ends of said element.

3. An electric heater of the type described comprising a support, a pair of parallel relatively closely and insulatingly spaced strip-like conducting members of relatively low resistivity and mounted upon said support, a sheet metal resistance heating element of relatively high resistivity being bent into a V and connected to one pair of adjacent ends of said members, to provide a series current path through said members and said element, the sides of said element being provided with recesses, to vary the heat distribution at the apex of the V and electric terminal means mounted upon said support and connected to the adjacent remaining ends of said members.

References Cited in the file of this patent

UNITED STATES PATENTS

| | | |
|---|---|---|
| 868,495 | Shipley | Oct. 15, 1907 |
| 1,684,143 | Pieper et al. | Sept. 11, 1928 |
| 1,792,688 | Graff | Feb. 17, 1931 |
| 2,033,897 | Jenkins et al. | Mar. 10, 1936 |
| 2,101,913 | Meyer | Dec. 14, 1937 |
| 2,396,594 | Moore | Mar. 12, 1946 |
| 2,421,125 | Krebs | May 27, 1947 |
| 2,510,308 | Dante | June 6, 1950 |
| 2,574,094 | Fever | Nov. 6, 1951 |
| 2,701,835 | Anton | Feb. 8, 1955 |
| 2,814,712 | Fulmer | Nov. 26, 1957 |